United States Patent [19]
Des Roches

[11] Patent Number: 5,195,767
[45] Date of Patent: Mar. 23, 1993

[54] TELESCOPING, EXTENDING GUIDE RAILS FOR USE WITH BOAT TRAILERS

[76] Inventor: Ronald J. Des Roches, 1007 8th St. SE., Minot, N. Dak. 58701

[21] Appl. No.: 518,183

[22] Filed: May 3, 1990

[51] Int. Cl.$^5$ .............................................. B60P 3/10
[52] U.S. Cl. .................................................. 280/414.1
[58] Field of Search ................................. 280/414.1; 414/532–536, 458

[56] References Cited

U.S. PATENT DOCUMENTS

| | | |
|---|---|---|
| 3,127,041 | 3/1964 | Flynn et al. |
| 3,127,042 | 3/1964 | Beckman |
| 3,131,902 | 5/1964 | Zak, Jr. |
| 3,140,003 | 7/1964 | Horner ............................ 280/414.1 |
| 3,403,798 | 10/1968 | Flachbarth et al. |
| 3,447,815 | 6/1969 | West ................................. 280/414.1 |
| 3,554,394 | 1/1971 | Hedman ........................... 280/414.1 |
| 4,033,600 | 7/1977 | Watson ............................. 280/414.1 |
| 4,050,595 | 9/1977 | Bussard ............................ 280/414.1 |
| 4,103,925 | 7/1978 | Palamara ......................... 280/414.1 |
| 4,138,135 | 2/1979 | Hewitt ............................. 280/414.1 |
| 4,268,211 | 5/1981 | Schwebke ........................ 280/414.1 |
| 4,268,212 | 5/1981 | Weary .............................. 280/414.1 |
| 4,468,150 | 8/1984 | Price ................................. 280/414.1 |
| 4,529,217 | 7/1985 | Wood ............................... 280/414.1 |
| 4,538,952 | 9/1985 | Chase ............................... 280/414.1 |
| 4,623,161 | 11/1986 | Sprague ........................... 280/414.1 |
| 4,826,197 | 5/1989 | Heinzen ........................... 280/414.1 |

*Primary Examiner*—Mitchell J. Hill

[57] ABSTRACT

An adjustable boat trailer guide rail assembly includes a pair of transverse slide assemblies, a pair of upright slide assemblies and a longitudinal guide assembly. A pair of guide rail assemblies are mounted to a boat support chassis to simplify the loading and unloading of boats to and from boat trailers. The guide rail assemblies are adjustable in generally transverse, upright and longitudinal directions relative to the boat trailer chassis to ease the frequently difficult task of loading a boat onto a trailer while standing on slippery surfaces, a task frequently complicated by wind and turbulent waters.

23 Claims, 2 Drawing Sheets

TELESCOPING, EXTENDING GUIDE RAILS FOR USE WITH BOAT TRAILERS

BACKGROUND OF THE INVENTION

1. Technical Field

The present invention relates to boat trailers and more particularly to extendible guide rails attachable to or integral with boat trailers for aiding in loading the boat onto the trailer or launching the boat.

2. Background Information

Trailers for towing boats behind trucks and automobiles are well known and widely used. However, lakeside loading and launching of the boat onto or off the trailer often poses a difficult problem, especially when attempting to handle the boat in windy conditions with heavy waves interfering with launching or retrieval. The task becomes more difficult as the boat size or wind profile increases. Typically, the trailer is attached to the rear of a vehicle and is backed into the water from which the boat is to be retrieved, but guiding the boat onto the trailer and achieving proper positioning of the boat with respect to the rollers or other structural components of the trailer can be very difficult. Often one person is required to ride in the boat to steer it toward the trailer while at least one other person must stand in the water near the trailer to help guide the boat. When this person has to stand on submerged portions of the trailer or on a lakebed or riverbed with slippery or sharp stones, the risk of injury from falling or other causes may be great. These tasks can be imposing even when the boat handlers are of normal strength and stature, but the challenges are even greater when the boat operator may be smaller of stature or may have reduced strength or endurance due to injury, age or the like.

When the water is extremely choppy due to strong winds and large waves, it can be much easier to load the boat onto the trailer if the boat is properly aligned with the trailer before it is positioned above the support chassis of the trailer. However, the prior art of which the inventor is aware teaches only limited attempts to provide this assistance to the person struggling to load the boat onto the trailer. U.S. Pat. No. 4,826,197 issued to Heinzen May 2, 1989, shows longitudinal guide members extending along the sides of the trailer that assist in aligning the boat with the trailer. However, these longitudinal guide members are fixed, and may not be adjusted to conform to boats of varying sizes. Further, the longitudinal guide members may not be extended beyond the rear end of the trailer during the loading operation.

U.S. Pat. No. 4,103,925 issued to Palamara Aug. 1, 1978, also shows longitudinal guide members extending along the sides of the trailer. Further, Palamara teaches the use of convergent entrance wing members extending beyond the rear end of the trailer. These wing members, however, extend beyond the end of the trailer even when the boat is being stored or transported, and thus increase the storage space needed to store the trailer and also the space through which the trailer and boat must swing during turns, making driving and towing more difficult.

Similarly, U.S. Pat. No. 4,033,600 issued to Watson Jul. 5, 1977, also shows longitudinal guide members extending along the sides of the trailer. However, as with those of Heinzen and Palamara, the longitudinal guide members may not be extended rearwardly to help align the boat with the trailer before loading.

Several references such as U.S. Pat. No. 4,623,161 issued to Sprague Nov. 18, 1986, U.S. Pat. No. 4,529,217 issued to Wood Jul. 16, 1985, U.S. Pat. No. 4,268,212 issued to Weary May 19, 1981, U.S. Pat. No. 4,268,211 issued to Schwebke May 19, 1981, and U.S. Pat. No. 3,447,815 issued to West May 1, 1967, show the use of upright means located on both sides of the rear end of the trailer to help guide the boat onto the trailer. Each of these references, however, requires that the bow of the boat be positioned forward of the rear end of the trailer before these boat-centering means provide significant assistance in aligning the boat with the trailer.

SUMMARY OF THE INVENTION

The present invention, which may be added to existing boat trailers or included with new ones, serves to aid with loading boats onto boat trailers. The invention includes a non-load-bearing guide rail system usable with conventional boat trailers and attaches to the sides of the trailer. The device assists in retrieving and launching boats when they leave and enter the water. It can be difficult to launch and retrieve a heavy, bulky boat in windy weather and in turbulent waves, and even more so with the larger sport boats. Such difficulties are likely to be even more pronounced for those whose strength or physical condition may be impaired by injury or advancing years. Frequently, the boat may be twisted sideways by wind and waves during launching and retrieval, and can become very difficult to manipulate on to or off the rear opening end of conventional boat trailers.

The invention includes a pair of side rails that telescope rearwardly and define a berth into which the boat can be steered while still in the water. These rails keep the boat oriented parallel with the trailer and permit it to be safely pulled onto the trailer, despite most wind and wave conditions. Each side rail is vertically and laterally moveable to accommodate boats of varying heights and widths, and also rearwardly and forwardly moveable to permit convenient storage of the rails alongside the boat during travel and storage of the trailer.

It is thus an object of the invention to simplify the operations of launching and retrieving boats during windy or rough water conditions. It is a further object of this invention to reduce the number of people required to aid in the operation of launching and retrieving boats from and to conventional boat trailers.

It is also an object of this invention to reduce the risk of injury to those who may be involved in helping retrieve a boat and load it onto a boat trailer.

It is a further object of this invention to provide extending side rails that extend beyond the rear portion of a conventional boat trailer to aid in properly aligning the boat to the boat trailer to simplify loading the boat onto the trailer.

These and other objects and advantages of the invention will appear more fully from the following description made in conjunction with the accompanying drawings in which like reference characters refer to the same or similar parts throughout the several views.

BRIEF DESCRIPTION OF THE DRAWINGS

FIG. 2 is a perspective view of an individual guide rail assembly illustrating the transverse, upright and longitudinal slide assemblies.

FIG. 3 is a top plan view of a trailer embodying the invention shown bearing a boat, the trailer having all members in the transport/storage position.

FIG. 4 is a top plan view of a trailer embodying the invention showing a boat being aligned for loading onto the trailer, the trailer having both longitudinal guide members in the rearwardly extended, loading position and both transverse slide members in the extended, loading position.

DESCRIPTION OF THE PREFERRED EMBODIMENT

Figure 1:
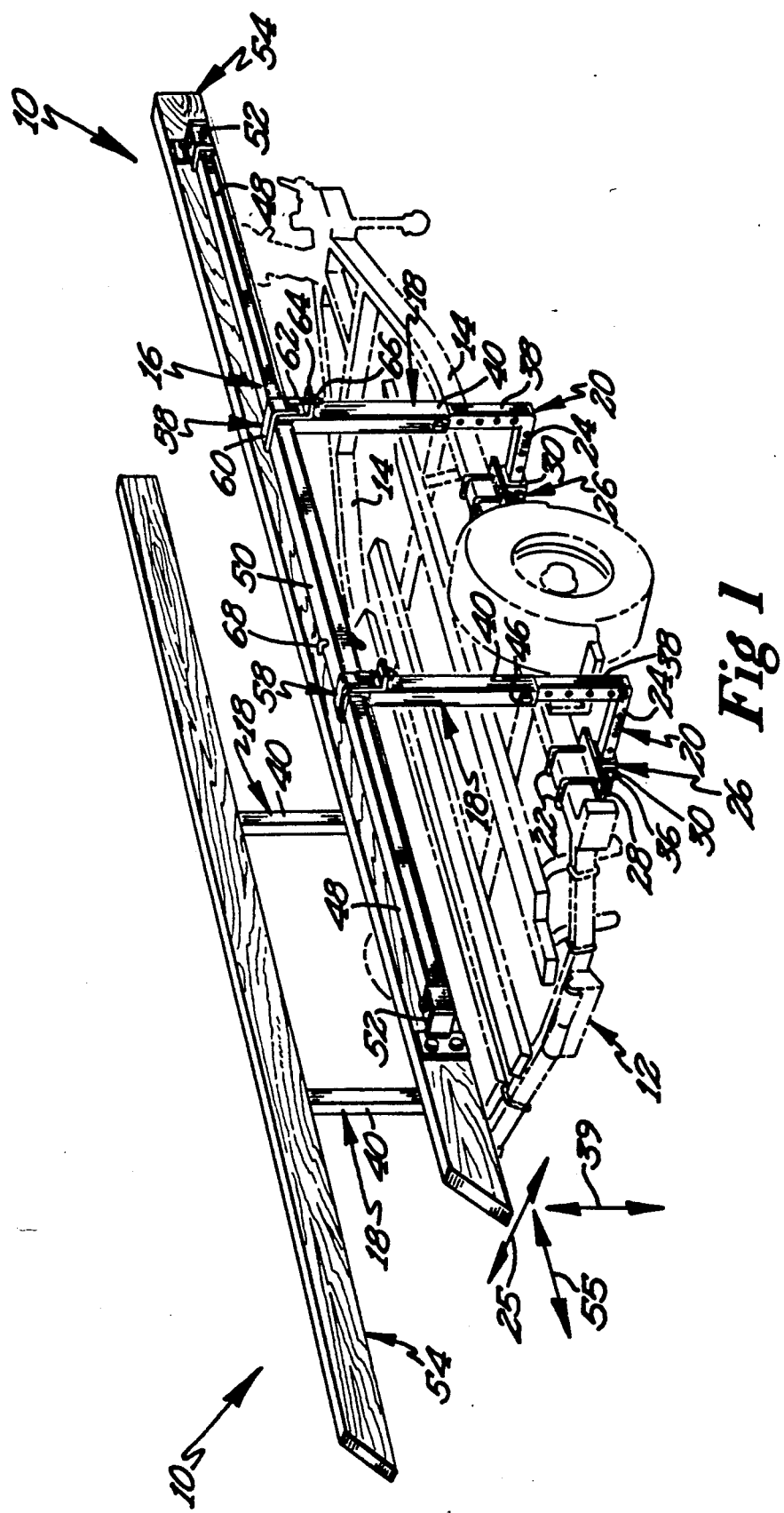
FIG. 1 is a perspective view of a trailer embodying the invention, showing the left longitudinal guide member in the rearwardly extended, loading position, and the right longitudinal guide member in the forward, transport/storage position.

With reference to the drawings, and in particular to FIG. 1, the guide rail assembly of the present invention is generally indicated by reference numeral 10. In FIG. 1, a pair of guide rail assemblies 10 is shown mounted to a conventional boat trailer or support chassis 12, which includes a releasable attachment means for fastening the trailer to a towing vehicle and at least one pair of opposed trailer support wheels. The trailer also includes a pair of spaced apart, longitudinal frame members 14.

In its preferred embodiment, the guide rail assemblies 10 each include a longitudinal guide assembly 16, a pair of upright slide or support assemblies 18 and a pair of transverse slide or support assemblies 20. Each guide rail assembly 10 is fastened to a frame member 14 with U-bolt fasteners 22 that cooperate with transverse slide assemblies 20.

Transverse slide assembly 20 includes a transverse slide portion 24 slidably received within transverse sleeve 30 of attachment assembly 26, which secures a guide rail assembly 10 to a boat trailer or support chassis 12. Attachment assembly 26 further includes U-bolt fasteners 22 fastened to retaining plate 28, which is fixedly attached as by welding to transverse sleeve 30. Transverse sleeve 30 is preferably constructed of 14 gauge, 1¼" square tubing, with at least one pair of matably opposed holes 32 disposed on the two sides of the tubing adjacent the side to which retaining plate 28 is fixed. Transverse slide portion 24 is preferably constructed of 11 gauge, 1¼" square tubing to provide a tube of cross section capable of being received within transverse sleeve 30, and includes several pairs of matably opposed holes 34. Transverse slide portion 24 slides within transverse sleeve 30 in the directions indicated by arrow 25, allowing transverse slide assembly 20 to be positioned to any of several working positions determined by the width of the boat. Locking means such as bolt 36 may then be passed through holes 32 and 34 and fastened into position to retain the transverse slide assembly 20 in the selected position. Each guide rail assembly 10 includes two transverse slide assemblies 20.

Figures 2, 3, 4:
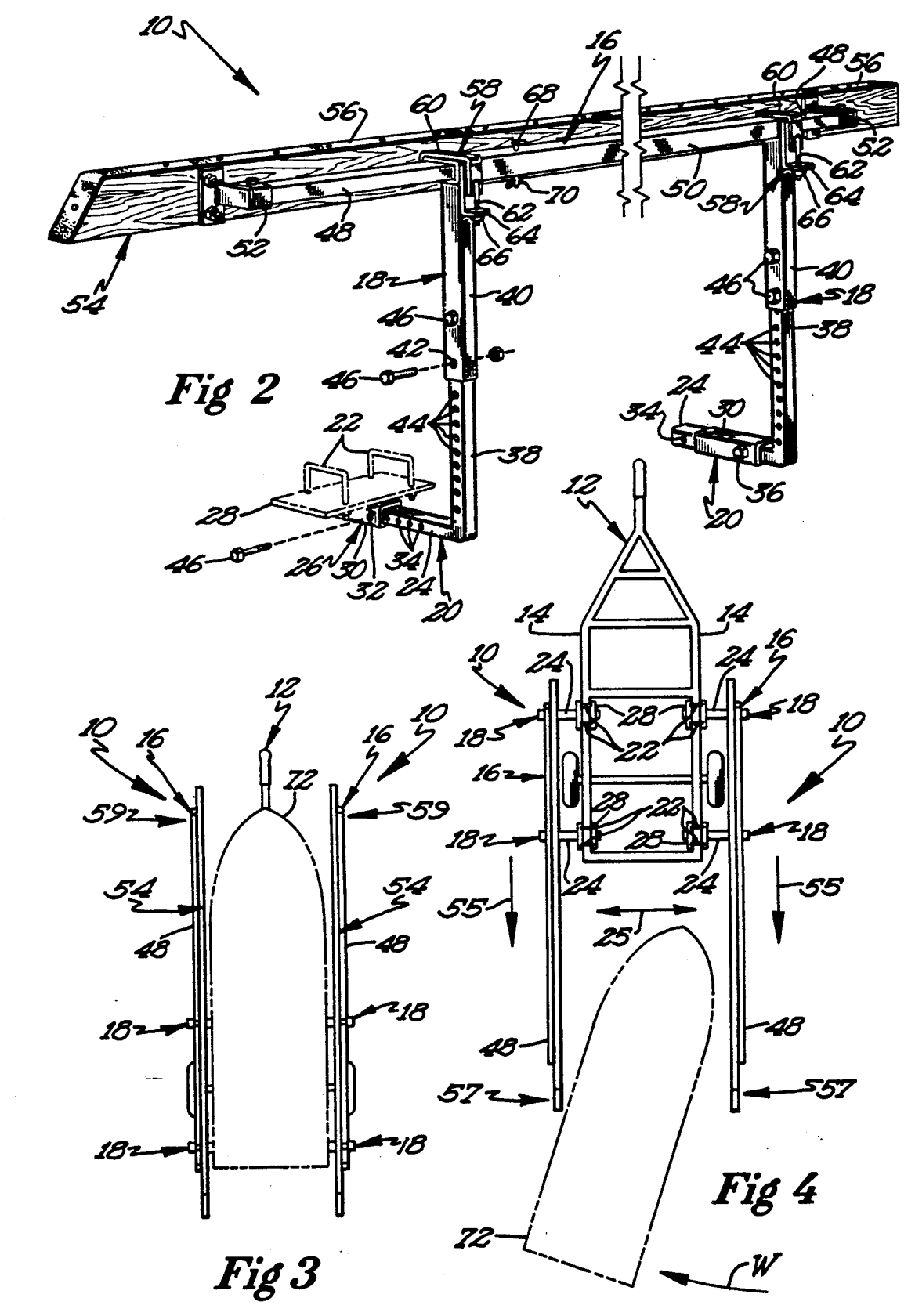

Upright slide assembly 18 includes an upright post 38 fixedly attached as by welding to transverse slide portion 24. In the preferred embodiment, there is an angle of approximately 102° between the transverse slide portion 24 and the upright post 38, although any generally upright relationship between the two members will provide a working embodiment, as long as an angle of at least 90° is provided between them. Upright post 38 is slidably received within upright post sleeve 40. The sleeve 40 is preferably constructed of 14 gauge, 1½" square tubing, with at least one pair of matably opposed holes 42 disposed on opposite sides of the tubing, as illustrated in FIG. 4. Upright post 38 is preferably constructed of 11 gauge, 1¼" square tubing to provide a tube of cross section capable of being received within upright post sleeve 40, and includes several pairs of matably opposed holes 44. Upright post 38 slides within upright post sleeve 40 in the directions indicated by arrow 39, allowing upright slide assembly 18 to be positioned to any of several working positions determined by the height of the boat. Locking means such as bolt 46 may then be passed through holes 42 and 44 and fastened into position to retain the upright slide assembly 18 in the desired position. Each guide rail assembly 10 includes two upright slide assemblies 18.

Longitudinal guide assembly 16 includes a longitudinal slide portion 48 slidably received within a longitudinal sleeve 50. Longitudinal slide portion 48 is fastened as by bracket assemblies 52 or other fastening means to longitudinal guide member 54, to which is attached metal reinforcement strap 56. Longitudinal guide member 54 is preferably made of wood, particularly dry hemlock, 2"×4"×13 feet long, and may be covered, with reinforcement strap 56, by a padded marine carpet or vinyl protector, although other materials may be substituted therefor as appropriate, and no cover is necessary for proper operation of the invention. Longitudinal guide member 54 slides in the directions indicated by arrow 55, and may be extended rearwardly to guide position 57 to define a boat reception area to help guide a boat onto the boat support chassis 12 (FIG. 4), and then returned to its forward, retracted position 59 after loading for moving or storing the boat on the trailer (FIG. 3). Longitudinal slide portion 48 is preferably made of 11 gauge, 1¼" square tubing, and is twelve feet long. Longitudinal sleeve 50 is preferably made of 14 gauge, 1½" square tubing, is approximately six feet long, and is attached to and extends between the two upright post sleeves 40 of the guide rail assembly 10. Longitudinal sleeve 50 may be attached to upright post sleeves 40 with releasable clamp means 58 that include metal strap 60 having a stud 62 welded thereto that passes through a hole in angle iron segment 64. Locking nut 66 is then attached to threaded stud 62, and the clamp means 58 tightened. Alternatively, longitudinal sleeve 50 may be welded to upright post sleeves 40. One pair of opposed matable holes are provided in longitudinal sleeve 50, and several pairs of similarly placed holes are provided in longitudinal slide portion 48, permitting pin 68 and cotter key 70, or other appropriate securing means, to be passed through mating sets of holes and securely position the longitudinal guide member 54 as needed for loading or transport/storage duties.

The embodiment described above is of a guide rail assembly 10 that is mountable to an already existing boat support chassis 12. However, it must be understood that the invention also may be integrally incorporated into almost any boat trailer.

In use, the guide rail assemblies 10 of the present invention are in position 59 as shown in FIG. 2 when the trailer is storing or transporting a boat. The height at which the longitudinal guide members 54, shown in FIGS. 1 and 4, are positioned depends on the size of the boat, but should be below the top of the boat a sufficient distance to define the sides of a berth along which the sides of the boat may be guided while being loaded onto the trailer. To adjust the height of the longitudinal guide members 54, bolts 46 are removed from upright slide assemblies 18, and upright post sleeves 40 are adjusted upwardly or downwardly as necessary with respect to upright posts 38 until the desired height is reached. Matable holes 42 and 44 are then realigned, and bolts 46 are reinserted into the proper location. This step is repeated for both guide rail assemblies 10. Once the upright slide assemblies 18 are adjusted to the size of the boat customarily transported on the trailer, they do not need to be readjusted when loading or unloading the boat, although they may be easily readjusted should the trailer be needed for a different sized boat. When a boat 72 is being loaded onto a boat support chassis 12, boat support chassis 12 is driven to the shore of the body of water in which the boat is located, and longitudinal guide members 54 are slid rearwardly to position 57 as shown in FIG. 4 by extending transverse slide assemblies 20 and extending longitudinal guide members 54 of longitudinal slide assemblies 16 rearwardly. Under certain conditions, such as when there are strong winds perpendicular to the length of the trailer, as suggested by wind vector W in FIG. 4, the user may wish to extend only the downwind longitudinal guide assembly 16, against which the boat would be allowed to slide as it is loaded onto the trailer. Longitudinal guide members 54 are adjusted by removing hairpin lock 70 from pin 68, and removing pin 68 from longitudinal sleeve 50. Longitudinal guide member 54 may then be telescoped rearwardly until the forward bracket assembly 52 encounters longitudinal sleeve 50. This step is repeated for both guide rail assemblies 10. Transverse slide assemblies 20 may be extended by removing bolts 36 and adjusting transverse slide portions 24 outwardly from transverse sleeves 30. Transverse slide assemblies 20, however, are generally adjusted only when a boat of a width varying from that of the last boat with which the trailer was used is loaded onto the trailer. Boat support chassis 12 is then moved into the water far enough so that the boat may be floated into position over boat support chassis 12. Once the boat has been positioned over and secured to boat support chassis 12, the above steps are reversed Longitudinal guide member 54 may then be telescoped forwardly to its retracted, transport/storage position 59.

If guide rail assemblies 10 are to be attached to a boat support chassis 12 as an add-on feature, transverse slide assemblies 20 are modified to include four U-bolt fasteners 22 for installation. These become the attachment assembly 26. In this embodiment, retaining plate 28 is fastened as by welding to sleeve 30. Attachment assembly 26 is then positioned on a longitudinal frame member 14 as shown in FIGS. 1 and 3, and fastened to frame member 14 by a pair of U-bolt fasteners 22. This step is repeated for each of the four transverse sleeves 30 needed to attach a pair of guide rail assemblies 10 to a boat support chassis 12.

While the preferred embodiments of the invention have been described, it should be understood that various changes, adaptations and modifications may be made therein without departing from the spirit of the invention and the scope of the appended claims.

What is claimed is:

1. A boat trailer, comprising:
    a boat support chassis having a frame, including means for releasably attaching the boat trailer to a towing vehicle and at least one pair of opposed trailer support wheels;
    a first guide rail assembly and a second guide rail assembly;
    said first guide rail assembly and said second guide rail assembly each include a transverse support assembly, an upright support assembly and a longitudinal guide assembly;
    said transverse support assembly includes a first attachment assembly fixed to said frame of said boat support chassis and a second attachment assembly fixed to said frame of said boat support chassis; and
    said first and second guide rail assemblies are selectively moveable relative to said chassis.

2. A boat trailer as recited in claim 1, wherein said transverse support assembly further comprises:
    a first transverse slide portion slidably received within said first attachment assembly; and
    a second transverse slide portion slidably received within said second attachment assembly.

3. A boat tailer as recited in claim 2, wherein said longitudinal guide assembly comprises:
    a longitudinal sleeve;
    a longitudinal guide member fixed to said longitudinal sleeve; and
    a longitudinal slide portion slidably received within said longitudinal sleeve.

4. A boat trailer as recited in claim 3, wherein:
    said boat support chassis includes a rearward end; and
    said longitudinal guide member includes a rearward end portion, said longitudinal guide member being selectively positionable between a retracted position and an extended position, said longitudinal guide member rearward end portion projecting substantially beyond said boat support chassis rearward end when said longitudinal guide member is located in its said extended position.

5. A boat trailer as recited in claim 3, wherein said upright support assembly comprises:
    a first upright post sleeve fixed to said longitudinal sleeve;
    a second upright post sleeve fixed to said longitudinal sleeve;
    a first upright post slidably received within said first upright post sleeve; and
    a second upright post slidably received within said second upright post sleeve.

6. A boat trailer as recited in claim 1, wherein said transverse support assembly further comprises:
    a first transverse support portion received within said first attachment assembly; and
    a second transverse support portion received within said second attachment assembly.

7. A boat trailer as recited in claim 6, wherein said longitudinal guide assembly comprises:
    a longitudinal sleeve;
    a longitudinal guide member fixed to said longitudinal sleeve; and
    a longitudinal slide portion slidably received within said longitudinal sleeve.

8. A boat trailer as recited in claim 7, wherein:
    said boat support chassis includes a rearward end; and
    said longitudinal guide member includes a rearward end portion, said longitudinal guide member being selectively positionable between a retracted position and an extended position, said longitudinal guide member rearward end portion projecting substantially beyond said boat support chassis rearward end when said longitudinal guide member is located in its said extended position.

9. A boat trailer as recited in claim 7, wherein said upright support assembly comprises:

a first upright post sleeve fixed to said longitudinal sleeve;

a second upright post sleeve fixed to said longitudinal sleeve;

a first upright post slidably received within said first upright post sleeve; and a second upright post slidably received within said second upright post sleeve.

10. A boat trailer as recited in claim 3, wherein said upright support assembly comprises:

a first upright post;

a second upright post;

means for fixing said first upright post to said longitudinal sleeve; and means for fixing said second upright post to said longitudinal sleeve.

11. An apparatus, attachable to a boat trailer chassis having a frame, for simplifying the loading and launching of boats to and from the trailer, comprising:

a first guide rail assembly and a second guide rail assembly;

said first guide rail assembly and said second guide rail assembly each include a transverse support assembly, an upright support assembly and a longitudinal guide assembly;

said transverse support assembly includes a first attachment assembly fixed to said frame of said boat support chassis and a second attachment assembly fixed to said frame of said boat support chassis; and said first and second guide rail assemblies are selectively moveable relative to the chassis.

12. An apparatus attachable to a boat trailer chassis as recited in claim 11, wherein said transverse support assembly further comprises:

a first transverse slide portion slidably received within said first attachment assembly; and a second transverse slide portion slidably received within said second attachment assembly.

13. An apparatus attachable to a boat trailer chassis as recited in claim 12, wherein said longitudinal guide assembly comprises:

a longitudinal sleeve;

a longitudinal guide member fixed to said longitudinal sleeve; and a longitudinal slide portion slidably received within said longitudinal sleeve.

14. An apparatus attachable to a boat trailer chassis as recited in claim 13, wherein:

said longitudinal guide member includes a rearward end portion, said longitudinal guide member being selectively positionable between a retracted position and an extended position, said longitudinal guide member rearward end portion projecting substantially beyond the boat trailer chassis rearward end when said longitudinal guide member is located in its said extended position.

15. An apparatus attachable to a boat trailer chassis as recited in claim 13, wherein said upright support assembly comprises:

a first upright post sleeve fixed to said longitudinal sleeve;

a second upright post sleeve fixed to said longitudinal sleeve;

a first upright post slidably received within said first upright post sleeve; and a second upright post slidably received within said second upright post sleeve.

16. An apparatus attachable to a boat trailer chassis as recited in claim 11, wherein said transverse support assembly further comprises:

a first transverse support portion received within said first attachment assembly; and a second transverse support portion received within said second attachment assembly.

17. An apparatus attachable to a boat trailer chassis as recited in claim 16, wherein said longitudinal guide assembly comprises:

a longitudinal sleeve;

a longitudinal guide member fixed to said longitudinal sleeve; and a longitudinal slide portion slidably received within said longitudinal sleeve.

18. An apparatus attachable to a boat trailer chassis as recited in claim 17, wherein:

said longitudinal guide member includes a rearward end portion, said longitudinal guide member being selectively positionable between a retracted position and an extended position, said longitudinal guide member rearward end portion projecting substantially beyond the boat trailer chassis rearward end when said longitudinal guide member is located in its said extended position.

19. An apparatus attachable to a boat trailer chassis as recited in claim 17, wherein said upright support assembly comprises:

a first upright post sleeve fixed to said longitudinal sleeve;

a second upright post sleeve fixed to said longitudinal sleeve;

a first upright post slidably received within said first upright post sleeve; and a second upright post slidably received within said second upright post sleeve.

20. An apparatus attachable to a boat trailer chassis as recited in claim 13, wherein said upright support assembly comprises:

a first upright post;

a second upright post;

means for fixing said first upright post to said longitudinal sleeve; and means for fixing said second upright post to said longitudinal sleeve.

21. A boat trailer, comprising:

a boat support chassis having a frame, including means for releasably attaching the boat trailer to a towing vehicle and at least one pair of opposed trailer support wheels, said boat support chassis having a rearward end;

a first guide rail assembly and a second guide rail assembly;

said first guide rail assembly and said second guide rail assembly each include a longitudinal guide member; and means carried by said chassis for movably mounting at least one of said first and second guide rail assemblies for movement relative to said chassis, said longitudinal guide member of said guide rail assembly being positionable between a transport position and a guide position, whereby said longitudinal guide members are substantially lateral of said chassis when positioned in said travel position, and said longitudinal guide members extend substantially beyond said rearward end of said chassis when positioned in said guide position to define a boat reception area to guide a boat onto the trailer during adverse wind and wave conditions.

22. A boat trailer as recited in claim 21, further comprising:

first and second transverse support assemblies, said first transverse support assembly permitting transverse motion of said first guide rail assembly and said second transverse support assembly permitting transverse motion of said second guide rail assembly.

23. A boat trailer as recited in claim 21, further comprising:

first and second upright support assemblies, said first upright support assembly permitting generally vertical motion of said first guide rail assembly and said second upright support assembly permitting generally vertical motion of said second guide rail assembly.

* * * * *